UNITED STATES PATENT OFFICE.

CALEB SANBORN, OF SOUTH BERWICK, MAINE.

IMPROVED MEDICINE FOR CROUP.

Specification forming part of Letters Patent No. 34,905, dated April 8, 1862.

*To all whom it may concern:*

Be it known that I, Dr. CALEB SANBORN, of South Berwick, in the county of York and State of Maine, have invented and compounded a new and useful Medicine for the Cure of Croup and Kindred Diseases, which I style "Croup Sirup" and "Soothing Drops;" and I do hereby declare that the following is a full and exact description of said medicine and the manner of compounding it.

The medicine is composed of *Lobelia inflata*, the herb, *Scutellaria latetriflora*, the herb generally known as "blue skull-cap," alcohol, high proof, best West India molasses, and pure water, compounded as follows, to wit: two pounds of *Lobelia inflata*, one pound of blue skull-cap, one and one-half gallon of alcohol, ninety-five per cent. proof, one and one-half gallon of pure water, and put them all into a jar that will hold three gallons or more, and set the jar with its contents in a room where the temperature is even and at about 60°, and let it steep fourteen days. Then strain off the tincture, and to the tincture thus made I add one and one-half gallon of best West India molasses, and thoroughly mix the compound, when the medicine is fit for use, thus making a very valuable one.

I have used this medicine for the cure of croup and throat diseases generally, also for children when teething, in my practice for the last ten years with great success. There is no medicine equal to it for the croup.

What I claim as my invention is—

The compounding and mixing the forenamed ingredients in the manner and relative proportion as herein set forth.

CALEB SANBORN. [L. S.]

Witnesses:
JOHN B. NEALLY,
EDWARD HAYMAN.